(12) United States Patent
Graves

(10) Patent No.: US 8,799,466 B2
(45) Date of Patent: Aug. 5, 2014

(54) METHOD AND APPARATUS FOR AUTOMATIC VERIFICATION OF A NETWORK ACCESS CONTROL CONSTRUCT FOR A NETWORK SWITCH

(75) Inventor: David Andrew Graves, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3222 days.

(21) Appl. No.: 11/048,254

(22) Filed: Jan. 31, 2005

(65) Prior Publication Data

US 2006/0174000 A1 Aug. 3, 2006

(51) Int. Cl.
*G06F 15/173* (2006.01)
*H04L 29/06* (2006.01)

(52) U.S. Cl.
CPC .................................... *H04L 63/10* (2013.01)
USPC .......................................... 709/225; 709/223

(58) Field of Classification Search
USPC ................................................ 709/225, 223
See application file for complete search history.

(56) References Cited

U.S. PATENT DOCUMENTS

| | | | | |
|---|---|---|---|---|
| 5,265,241 A * | 11/1993 | Arnold et al. | ..................... | 710/15 |
| 6,131,119 A * | 10/2000 | Fukui | ............................ | 709/224 |
| 6,343,324 B1 * | 1/2002 | Hubis et al. | ..................... | 709/229 |
| 6,484,245 B1 * | 11/2002 | Sanada et al. | ................... | 711/164 |
| 6,622,220 B2 * | 9/2003 | Yoshida et al. | ................ | 711/152 |
| 7,185,047 B1 * | 2/2007 | Bate et al. | ...................... | 709/202 |
| 7,188,164 B1 * | 3/2007 | Etheridge | ...................... | 709/221 |
| 7,225,263 B1 * | 5/2007 | Clymer et al. | ................ | 709/229 |
| 7,370,092 B2 * | 5/2008 | Aderton et al. | ................ | 709/220 |
| 7,523,485 B1 * | 4/2009 | Kwan | ................... | 726/2 |
| 7,636,937 B1 * | 12/2009 | Bhattacharya et al. | ........... | 726/2 |
| 2003/0221115 A1 * | 11/2003 | Itoh et al. | ....................... | 713/189 |
| 2004/0249916 A1 * | 12/2004 | Graves et al. | ................. | 709/223 |
| 2004/0260818 A1 * | 12/2004 | Valois et al. | .................... | 709/229 |
| 2005/0108375 A1 * | 5/2005 | Hallak-Stamler | .............. | 709/223 |
| 2006/0274774 A1 * | 12/2006 | Srinivasan et al. | ............ | 370/420 |
| 2008/0046553 A1 * | 2/2008 | Yamashita | ..................... | 709/223 |
| 2008/0186971 A1 * | 8/2008 | Carmichael et al. | .......... | 370/392 |
| 2011/0283279 A1 * | 11/2011 | Graves | ............................... | 718/1 |

* cited by examiner

*Primary Examiner* — Waseem Ashraf

(57) ABSTRACT

Embodiments of the invention provide a method and an apparatus for automatic verification of a network access control construct for a network switch. In one method embodiment, the present invention accesses an actual network access control construct on a network switching device, the actual network access control construct for defining the device actually coupled with the network switching device. Additionally, a machine-readable map of the network is accessed, the map providing a pre-determined network access control construct defining the device which should be coupled with the network switching device. A validation is performed, wherein the validation verifies that the actual network access control construct on the network switching device correlates with the pre-determined network access control construct defined by the machine-readable map.

21 Claims, 6 Drawing Sheets

METHOD AND APPARATUS FOR AUTOMATIC VERIFICATION OF A NETWORK ACCESS CONTROL CONSTRUCT FOR A NETWORK SWITCH

TECHNICAL FIELD

The present invention generally relates to network switches. More specifically to a system and method for automatic verification of a network access control construct for a network switch.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems and switches (as well as other devices). Another common type of network configuration is a storage area network (SAN). In actual practice, a typical SAN will include large numbers of disk logical units (LUNs) of a disk array and switches (as well as other devices). Devices such as computer systems, routers, switches, load balancers, firewalls, and the like, are commonly linked to each other in networks.

Generally, the in-house data centers include technicians working from a network operation center (NOC). The technicians issue commands to control the deployment of servers and to control the supporting infrastructures, such as disk logical units (LUNs) in a disk array, network switches in the LAN, and switches in the SAN.

Once the servers, the SAN switches and the disk array have been configured to properly map one or more LUNs to a server, additional security can be achieved by defining a network access control construct, such as an access control list (ACL), that specifies the source and destination port identifiers for the devices that are allowed to communicate via the ports of the SAN switches. Therefore, the ACL prevents abusive or erroneous use of the SAN including access to the LUNs of the disk array in an unauthorized manner.

In general, the network access control constructs (e.g., ACLs) that are configured by commands from the NOC, include many steps which must be coordinated. This method is expensive and prone to error, especially if the data center environment is dynamic, with high demand for changes in computer deployment and therefore a need to change the content of the ACLs. Additionally, a malicious attack on the configuration of the SAN switches could result in alteration of ACL definitions, thereby allowing the attacker to access confidential data.

Disclosure of the Invention

Embodiments of the invention provide a method and an apparatus for automatic verification of a network access control construct for a network switch. In one method embodiment, the present invention accesses an actual network access control construct on a network switching device, the actual network access control construct for defining the device actually coupled with the network switching device. Additionally, a machine-readable map of the network is accessed, the map providing a pre-determined network access control construct defining the device which should be coupled with the network switching device. A validation is performed, wherein the validation verifies that the actual network access control construct on the network switching device correlates with the pre-determined network access control construct defined by the machine-readable map.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
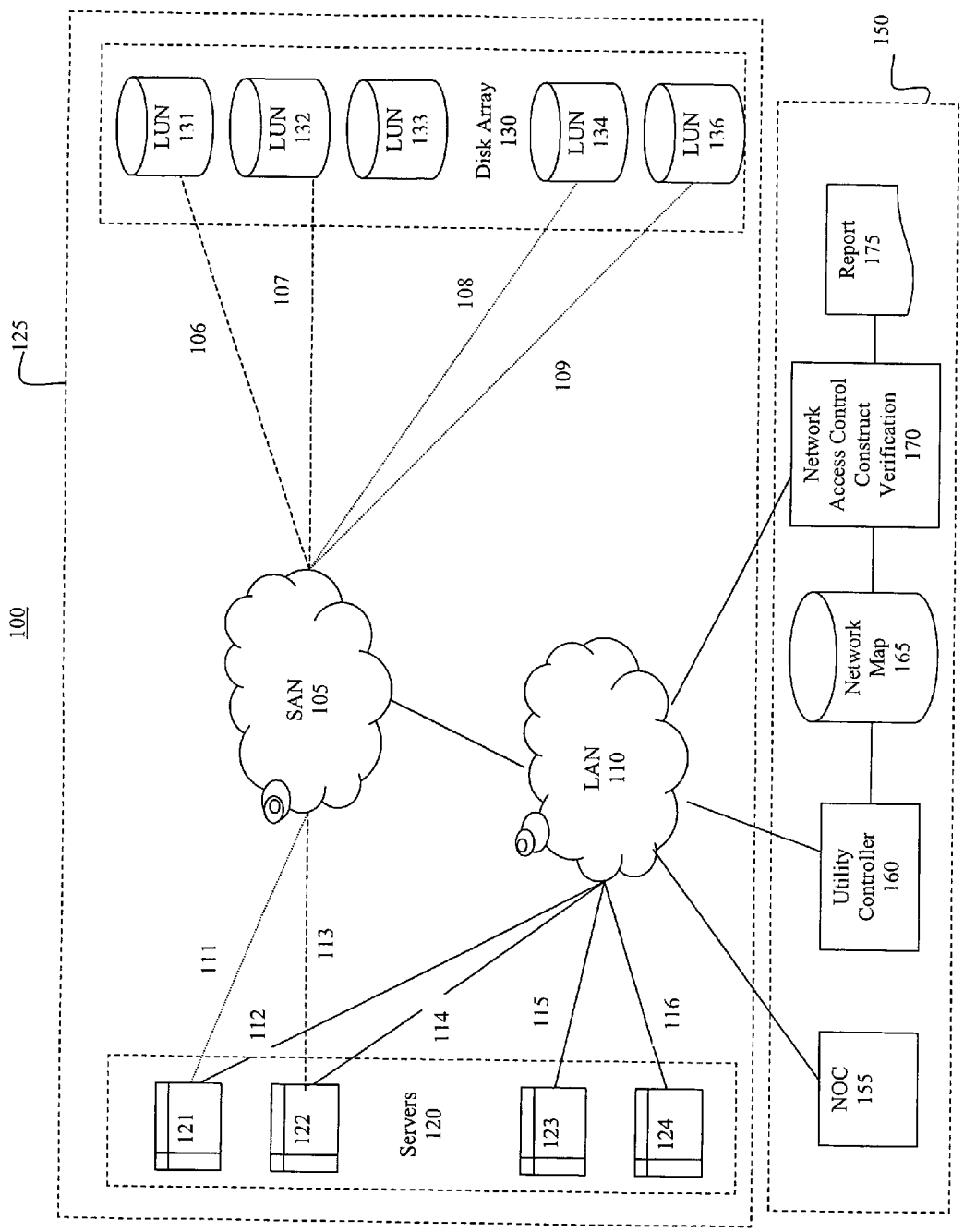
FIG. 1 is a block diagram of an exemplary network including a LAN and SAN upon which embodiments of the present invention can be implemented.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. RAM, ROM and data storage devices are examples of computer-usable medium. The instructions that are stored on the RAM, ROM and data storage devices are examples of computer-readable program code stored on computer-usable medium.

Embodiments of the present invention relate to the automatic verification of network access control constructs for a network switch. The present description begins with an overview of a network map and one embodiment of a network environment. The details of the network access control construct's use and operation are then described in detail.

In one embodiment, the network map lists each individual network device and the attributes of the device. For example, the attributes of a device may include, but are not limited to, the make, model, type, role, and unique identifier of the device. Additionally, the network map may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable. One exemplary embodiment of a network which results from a network map is shown in FIG. 1.

With reference now to FIG. 1, a block diagram of an exemplary network 100 is shown in accordance with one embodiment of the present invention. In general, network 100 includes a provisionable portion 125 and a utility data center portion 150. In one embodiment, provisionable portion 125 includes a local area network (LAN) 110 communicatively coupled with a storage area network 105. LAN 110 can include elements such as racks, routers, cables, switches and other elements that are well known in the art. SAN 105 can also include elements such as switches, routers, cables, and the like. Network 100 also includes a plurality of servers 130 coupled with both the SAN 105 and the LAN 110. Additionally, network 100 includes a plurality of LUNs within a disk array 130 coupled with SAN 105.

In one embodiment, the data center portion 150 includes the network operations center 155, a utility controller 160, a network map 165, a network access control construct verification portion 170, and a report portion 175. As described herein, the network operation center 155 is a central management location accessible to technicians. The utility controller 160 is an automated process for managing the network. The network map 165 is a machine-readable map of the actual physical layout of the network as well as the up-to-date allocation of the network 100 resources (e.g., the provisionable portion 125). The network access control construct (e.g., an access control list (ACL)) verification portion 170 and the optional report 175 are described in more detail herein.

In one embodiment, LAN 110 and SAN 105 include a number of connections 111 through 116 coupled to a number of computing devices 121-124 (e.g., servers 120). Typically, the servers 121-124 are connected with the LAN 110 or SAN 105 using cables or the like. However, wireless connections between the computing devices and LAN 110 and/or SAN 105 are also contemplated.

In another embodiment, SAN 105 includes a number of connections 106 through 109 coupled to a disk array 130 having a number of logical unit identifiers (LUNs) 131-136. Typically, the LUNs 131-136 are stored in a single location, although this may not always be the case. In this embodiment, the LUNs 131-136 are shown as being interconnected with the SAN 105 using cables or the like. However, wireless connections between the LUNs 131-136 in SAN 105 are also contemplated.

Figure 2:
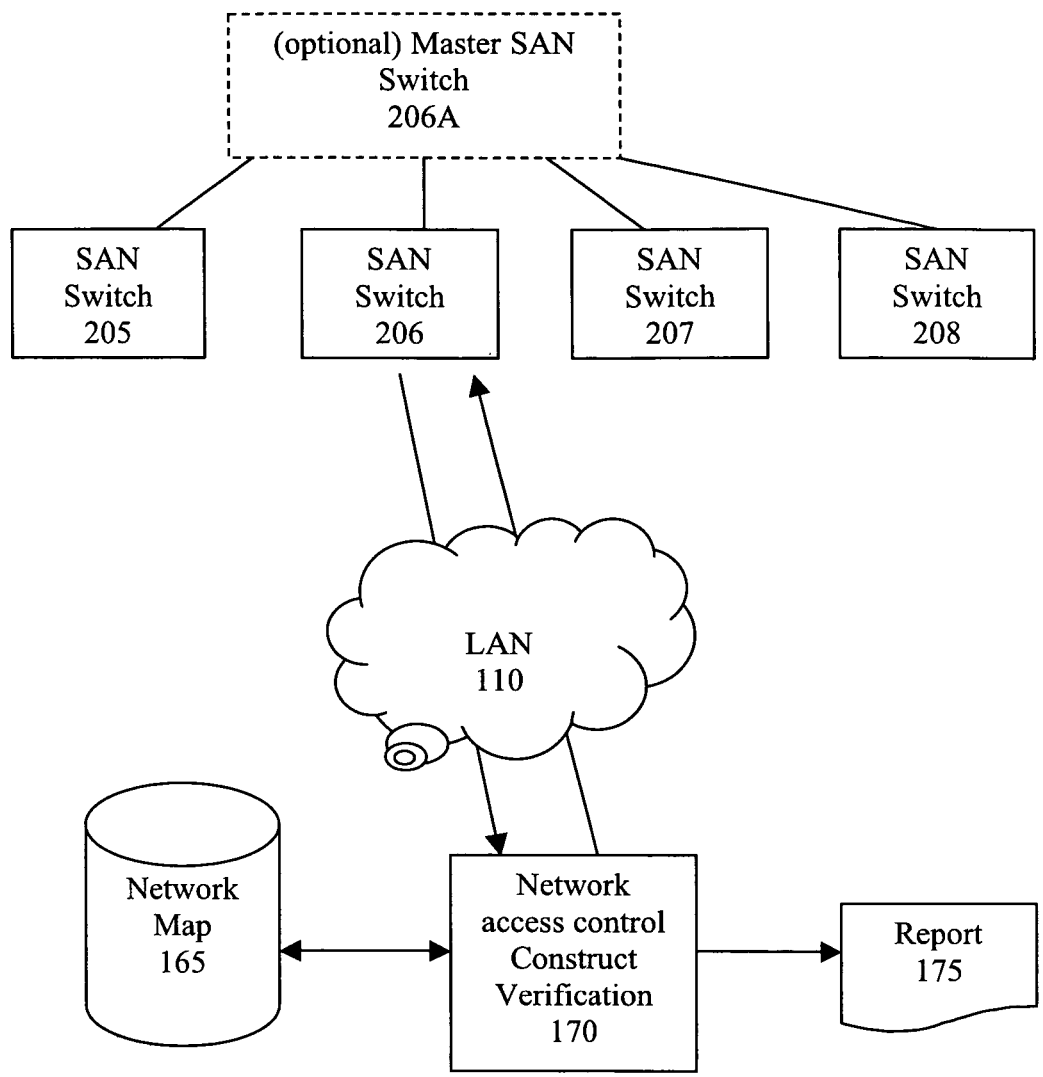
FIG. 2 is a block diagram of the network access control construct verification program accessing the switches in accordance with one embodiment of the present invention.

In one embodiment, the connections 111-116 and 106-109 are connected to switches such as the switches 205-208 of FIG. 2. That is, although switches 205-208 are SAN switches, they may just as appropriately be LAN switches or a combination of LAN and SAN switches. In general, the switches are capable of being programmed or configured such that LAN 110 and/or SAN 105 are logically separated into a number of VLANs or VSANs. The programming or configuring of these switches can be changed, thereby changing the resources allocated to the various VLANs or VSANs. For example, by changing the configuration of switch 205, computer system 120 can be "virtually moved" from one VLAN or VSAN to another. The allocation and reallocation of resources between VLANs or VSANs is one of the valuable operations performed after the actual physical building of the network structure.

One example of a VSAN is shown by the dotted line in FIG. 1 wherein a server 121 is in a VSAN including cable 111 via SAN 105 and further including LUNs 134 and 136 and also cables 108 and 109. A second example of a VSAN is shown in FIG. 1 wherein a server 122 is in a VSAN including cable 113 via SAN 105 and further including LUNs 131 and 132 and also cables 106 and 107.

In addition to computer systems and switches, LAN 110 and SAN 105 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the LAN and SAN and a representation of each VLAN and VSAN. Other information included in a network map includes, but is not limited to: the network or MAC (media access control) address for the resources of the LAN and/or SAN; the port numbers of the configurable devices; the VLAN and/or VSAN identifiers associated with each of the port numbers; the socket identifier for each cable connected to each of the resources of LAN and/or SAN; manufacturer and model numbers; and serial numbers.

With reference now to FIG. 2, the network access control construct (in one embodiment an access control list (ACL)) verification program 170 reads the desired configuration from the network map 165 and then accesses one or more of the SAN switches (e.g., 205-208). In one embodiment, the network access control construct verification program 170 accesses the switches over the LAN 110. In another embodiment, the network access control construct verification program 170 may access only a master SAN switch (e.g., optional master SAN switch 206A) which will provide the information for itself and every slave SAN switch it maintains. The network access control construct verification program 170 will check the ACL definitions, verifying the validity of the ACLs, and identifying any errors associated therewith utilizing methods described in detail herein.

Examples of the ACL errors may include errors of omission, errors of inclusion, errors of correctness, or the like. In one embodiment, configuration errors in the ACLs are corrected by reconfiguring the SAN switch. In another embodiment, the network access control construct verification program 170 creates a script that can be verified and approved by technical personnel, prior to running the script to make the corrections. The network access control construct verification program 170 can optionally create a detailed report, indicating all of the ACLs that were checked, and indicated which ACLs were correct, thus providing an automated audit of SAN security. In another embodiment, the network access control construct verification program 170 can optionally create a detailed report of which ACLs were invalid, and the specific details of which data item in the ACL was incorrect and what the value should be.

Figure 3:
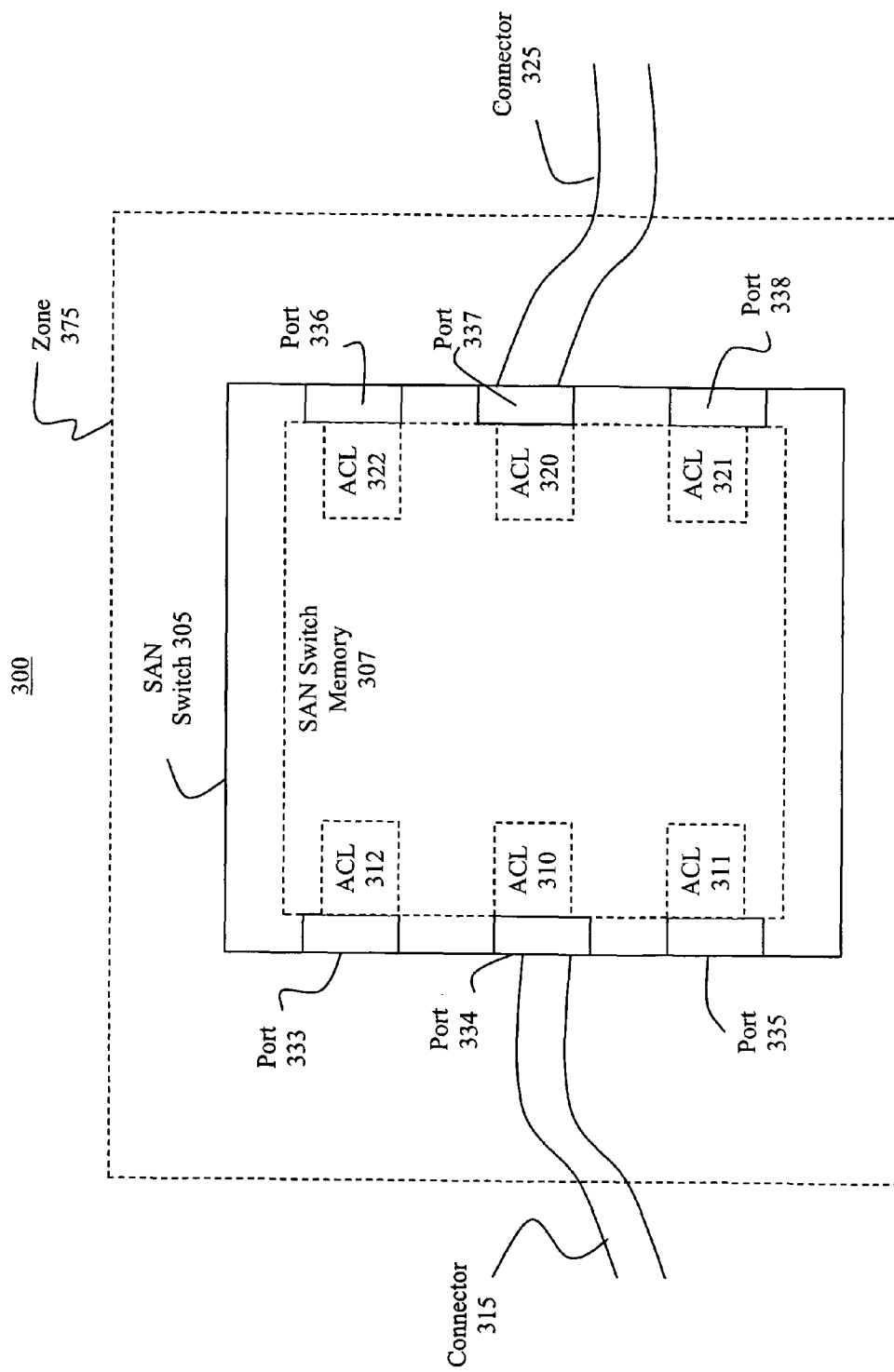
FIG. 3 is a block diagram of an exemplary switch having a network access control construct in accordance with one embodiment of the present invention.

With reference now to FIG. 3, a block diagram 300 of a SAN switch 305 is shown in accordance with one embodiment of the present invention. In general, SAN switch 305 includes a SAN switch memory 307, a plurality of access control constructs (e.g., ACLs 310-312 and 320-322), and ports 333-338. It is appreciated that although six ports are shown SAN switch 305 may have more or fewer ports. In addition, although an ACL is shown for each port, there may be ports within SAN switch 305 that do not have an associated ACL coupled therewith. In one embodiment, SAN switch 305 has an input ACL 310 which is coupled with port 334. Moreover, port 334 is utilized by the connection 315 to connect with the SAN switch 305. Additionally, the SAN switch 305 has an output ACL 320 which is coupled with port 337. Moreover, the port 337 is utilized by the connection 325 to connect with the SAN switch 305. Although one of the sets of ports, ACLs and connectors is stated as an input and one as an output, it is appreciated that the data may flow either direction. The utilization of designated input and output sides is merely for purposes of clarity during the description. In one embodiment, the ACL is a software program stored in the SAN switch memory 307, such as a program stored in a flash memory, or the like As described herein, the ACL (e.g., 310-312 and/or 320-322) is utilized to provide a "security gate" between the connection and the switch. For example, connector 315 is coupled with SAN switch 305 on one end. On the other end, connector 315 is coupled with a computing device (e.g., server 121). In the network map, the connector 315 is dedicated to a specific computing device. Therefore, the specific computing device (e.g., server 121) will have a specific name, for example, an identifier such as a World Wide Name (WWN) that will differentiate the computing device (e.g., server 121) from other computing devices (e.g., server 122).

To ensure that only the designated computing device (e.g., server 121) is accessing the SAN switch 305 via a specific port, a network access control construct, such as the ACL 310, is utilized to check the WWN (or other type of identifier) of the computing device (e.g., server 121) coupled with connector 315. By utilizing the ACL 310 to check the identification of the accessing computing device (e.g., server 121) prior to the device actually accessing the switch (e.g., SAN switch 305), security of the network is maintained. That is, since the computing device (e.g., server 121) is identified prior to accessing the SAN switch 305, there is a security barrier stopping unauthorized computing systems from accessing and/or utilizing SAN switch 305 and any components coupled therewith.

Figure 4:
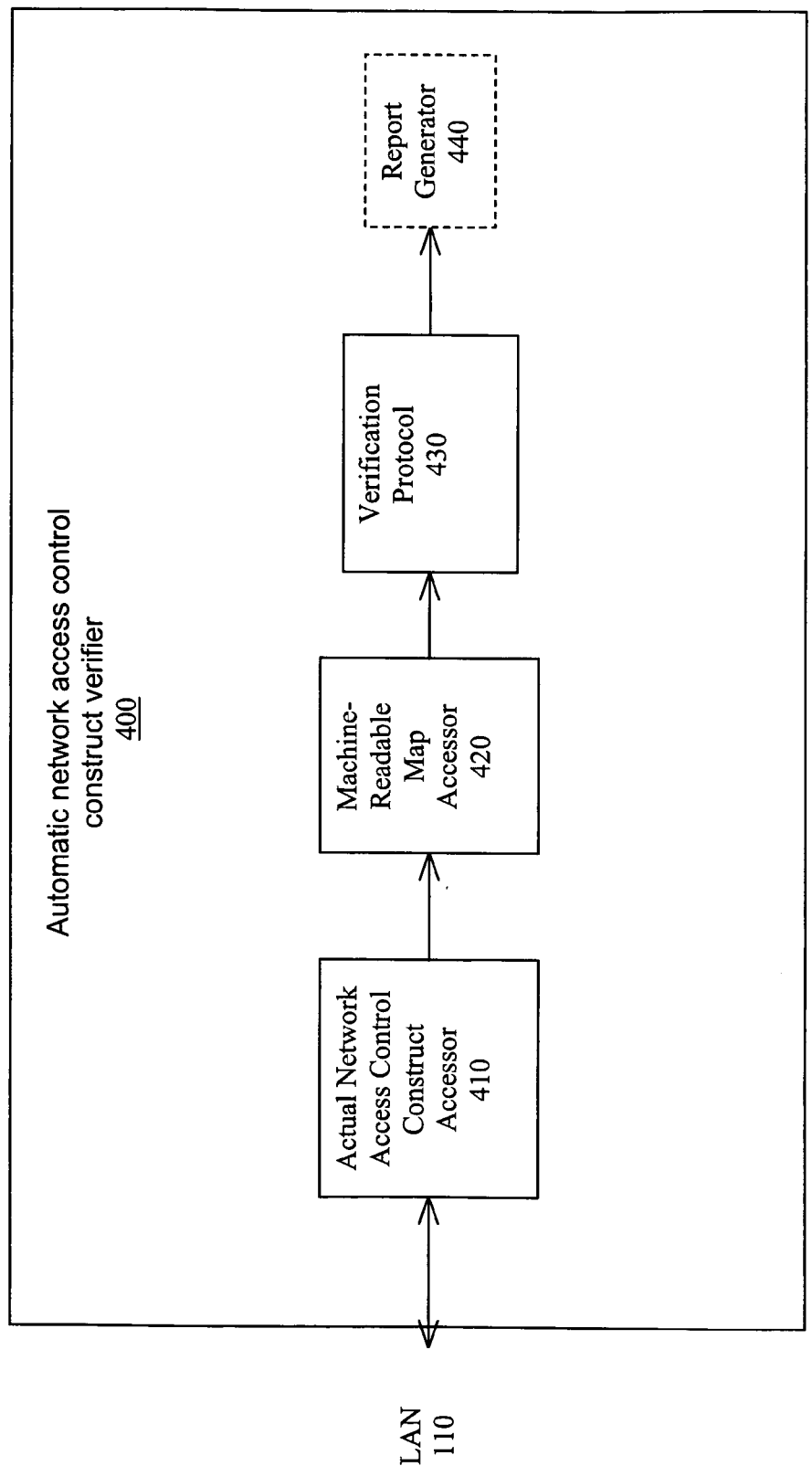
FIG. 4 is a block diagram of an exemplary network access control construct verifier in accordance with one embodiment of the present invention.

With reference now to FIG. 4, a block diagram 400 of an automatic verifier of a network access control construct for a network switch is shown in accordance with an embodiment of the present invention. In one embodiment, the network access control construct verifier 400 includes a network access control construct accessor 410. The network access control construct verifier 400 also includes a machine-readable map accessor 420. The network access control construct verifier 400 further includes a verification protocol 430. In one embodiment, the network access control construct verifier 400 also includes an optional report generator 440.

As described herein, network access control construct verifier 400 is utilized to verify that the device accessing the network switch is the correct device. In operation, the network access control construct verifier 400 initially utilizes the network access control construct accessor 410 to accesses a network access control construct, such as ACL 310 of FIG. 3. The network access control construct accessor 410 then receives the status of the network access control construct (e.g., ACL 310). For example, the WWN (or other identifier) of the device authorized to access (or actually accessing) the network switch 300 via the connector 315.

The network access control construct verifier 400 then utilizes the machine-readable map accessor 420 to access the machine-readable map (e.g., map 165 of FIG. 1) and retrieve the WWN of the device which is supposed to be authorized to access the network switch 300 via the connector 315.

The network access control construct verifier 400 then utilizes the automatic verification protocol 430 to compare the results from the network access control construct accessor 410 to the results from the machine-readable map accessor 420. In one embodiment, once the results are compared, the optional report generator 440 generates a report. The report may be a report stating that the network access control construct is correct, or that it is incorrect, or that it is not-operating, that it is missing, or the like. In another embodiment, if the result of the comparison of actual to map ACL does not match, an automatic fix is applied via the network access control construct verifier 400. For example, the network access control construct verifier 400 will reapply the information from the network map to the actual ACL operating at the SAN switch.

Figure 5:
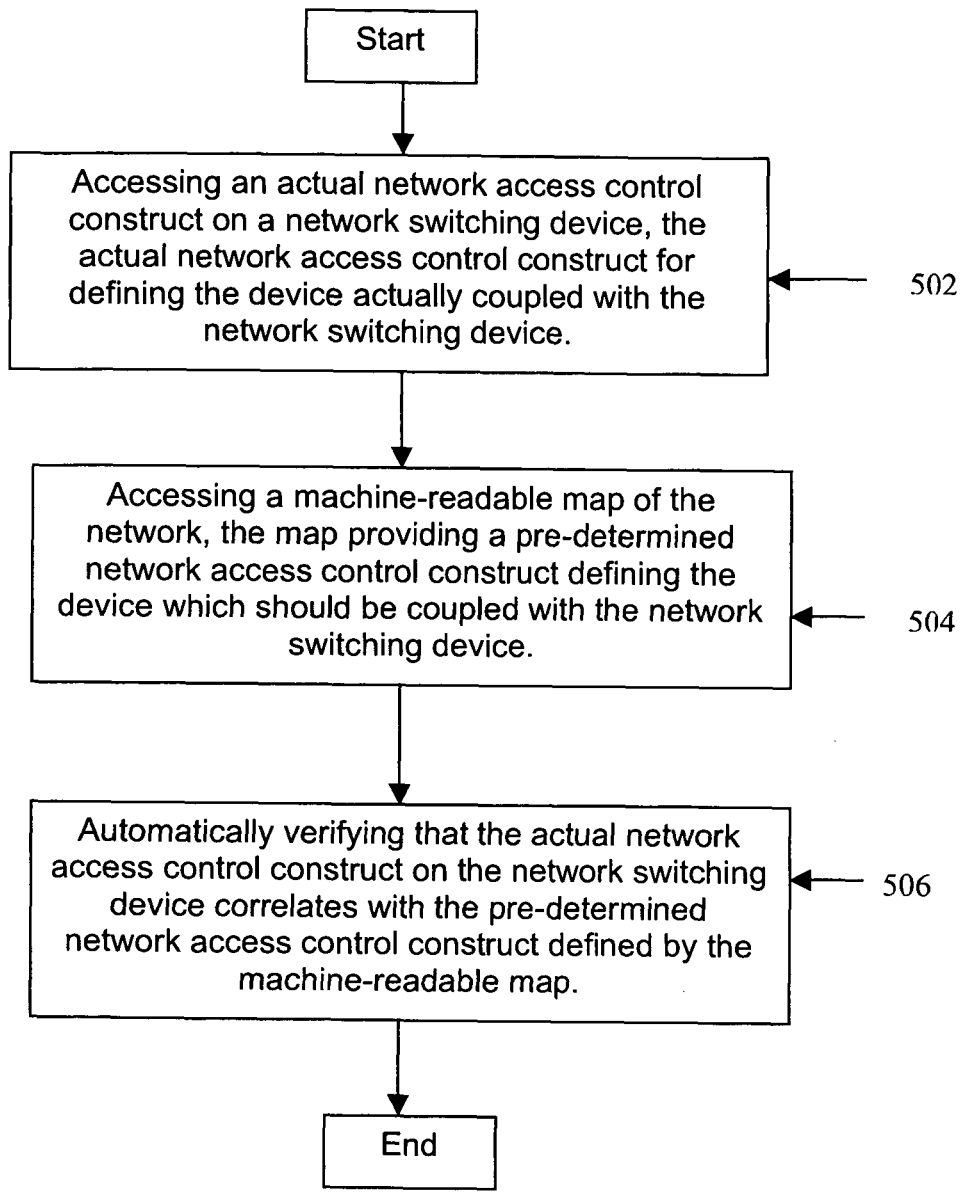
FIG. 5 is a flowchart of a method for automatic verification of a network access control construct for a network switch in accordance with one embodiment of the present invention.

Referring now to FIG. 5, a flowchart of one method for automatic verification of a network access control construct for a network switch is shown in accordance with one embodiment of the present invention.

With reference now to step 502 of FIG. 5, and to FIG. 2, one embodiment accesses an actual network access control construct on a network switching device, wherein the actual network access control construct is utilized for defining the device actually coupled with the network switching device. For example, the network access control construct verifier 170 will contact a SAN switch (e.g., SAN switch 206) via a LAN and query the network access control construct.

In one embodiment, the network access control construct verifier 170 query will verify the network access control construct is the appropriate construct by receiving the unique identifier of the network access control construct. In another embodiment, the network access control construct verifier 170 will verify the port number on the network switching device port to which the network access control construct is coupled. The network access control construct verifier 170 will then query for a status of the network access control construct (e.g., operational, etc.) and the identifier of the computing device utilizing the construct to access the switch (e.g., via a specific port). In one embodiment, the identifier is a unique identifier for the computing device, such as a WWN.

In another embodiment, the automatic verification of network access control constructs for a network switch accesses a master network switching device 206A which provides a plurality of actual network access control constructs for a plurality of ports and/or network switches. In another embodiment, each network switch is accessed individually. In yet another embodiment, each port on each network switch is accessed individually.

With reference now to step 504 of FIG. 5, and to FIG. 2, one embodiment accesses a machine-readable map of the network, wherein the map provides a pre-determined network access control construct defining the device which should be coupled with the network switching device. For example, the network access control construct verification program 170 will contact a machine-readable map 165 and query the map 165 regarding the specific network access control construct. As described herein, the query will include a status request of the network access control construct and the identifier of the computing device that should be utilizing the connector to access the switch (e.g., via a specific port). In one embodiment, the identifier is a unique identifier for the computing device, such as the WWN.

Referring now to step 506 of FIG. 5 and to FIG. 2, one embodiment automatically verifies that the actual network access control construct on the network switching device 206 correlates with the pre-determined network access control construct defined by the machine readable map 165. For example, the verification will verify that the actual network access control construct is correct for the particular port of the network switch to which it is associated. That is, a verification is performed by comparing the WWN defined in the actual network access control construct with the WWN defined in the machine-readable map pre-defined network access control construct.

In one embodiment, a second verification is also performed. A verification that every actual network access control construct is defined in the machine-readable map pre-defined network access control construct. That is, to ensure that there are no remaining network access control constructs in the network (e.g., the SAN) that have not been examined. In other words, verify that there are no network access control constructs in the SAN fabric that do not have an associated network access control construct in the map. This verification ensures that a network access control construct has not been removed from a network switch.

Referring still to step 506 of FIG. 5, in one embodiment, each time an error is found during the verification process, an error message is provided indicating the details of the actual network access control construct error. In one embodiment, the error message may also provide instructions for automatic correction of the network access control construct error. For example, the error message may contain machine-readable code that can be automatically utilized to fix the error associated with the network access control construct. In another embodiment, the verification process may automatically fix the error associated with the network access control construct and provide a report of the error. In yet another embodiment, the verification process may automatically fix the error and provide an "actions taken" message as a portion of the error message.

In one embodiment, the automatic verifier will provide a report documenting the result of the automatic verifying. That is, providing a user-readable report outlining the results of the analysis including correctly operating network access control constructs. The report may include the number of network access control constructs verified, the identifier of each of the network access control constructs, the switch and/or port identifier for each network access control construct, the WWN of the device coupled with the network access control construct, and the like. In another embodiment, the report may be configured to provide whatever information the data center administrator desires. That is, the report format, output and information thereon are adjustable based on user preference.

Figure 6:
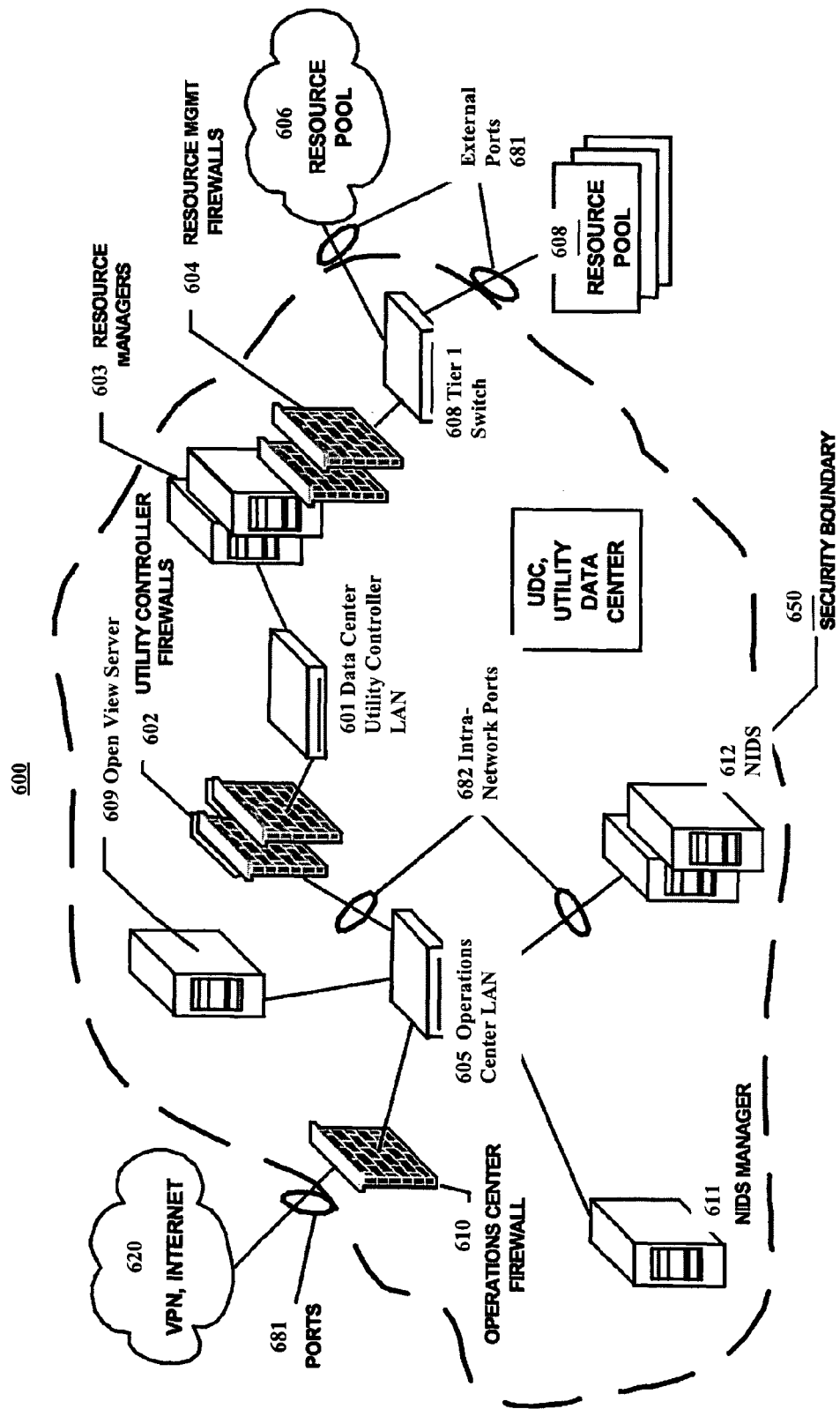
FIG. 6 illustrates a utility data center in accordance with one embodiment of the present invention.

FIG. 6 illustrates an exemplary provisionable network in which embodiments of the present invention can function. Provisional network, or utility data center (UDC), 600 is shown bounded by a virtual security boundary 650. Boundary 650 is shown here only to help illuminate the concepts presented herein. Typical UDC 600 comprises an operations center local area network (LAN) 605, a data center utility controller LAN 601 and resource pools 606. It is noted here that, by their very nature, UDCs are flexible in their composition, comprising any number and type of devices and systems. It is this flexibility from which they derive their usefulness. The specific architecture illustrated in FIG. 6, therefore, is not meant to limit the application of embodiments of the present invention to any particular provisionable network architecture.

Typical UDC 600, in this illustration, communicates with the outside world via the Internet 620 and virtual public networks (VPNs) in the Internet. The communications links that enable this communication are protected by firewall 610. Firewall 610 is shown to illustrate a concept and is not meant to imply any particular method or system of intrusion protection. Many types of hardware and software firewalls are well known in the art and firewall 610 may be either or both.

It is noted here that communications into and out of a provisionable network, as in any network, is accomplished through ports such as illustrated at 681. Communications between devices within a network are also conducted through ports, as alluded to at 682. It is noted that ports are not necessarily physically located at the periphery of a network but are logical end points. External ports 681 and intra-network ports 682 are shown only to help illustrate the concepts presented in embodiments of the present invention. It is also noted that security boundary 650 is virtual. That is, it does not exist in a physical sense. Resources included in the servers and LANs comprising utility data center 600 may include devices and servers located remotely from the other elements of the UDC.

Embodiments of the present invention operate in an environment that distinguishes between three trust domains established in the trust hierarchy of a utility data center. One trust domain is embodied in the Operations Center (OC) LAN 605 where non-critical UDC and other operations-related functions reside. The level of trust is less than the Data Center Utility Control LAN 601. Another trust domain is the data center utility controller LAN 601 where tasks relating to the automated provisioning of managed resources 606 reside. Access to the Data Center utility controller LAN 601 is severely restricted from this domain. A third domain comprises the managed resources LANs where the managed resources 606 reside. These LANs are typically not trusted. It is noted here that clients of the utility data center originate outside the above trust structure and access elements of the UDC via the Internet or a virtual private network (VPN) resident in the Internet infrastructure.

As shown in FIG. 6, operations center (OC) LAN 605 comprises an internal trust domain. Included in OC LAN 605 are open view server 609, network intrusion detection system (NIDS) 612 and NIDS manager 611. It is noted that, though NIDS 612, NIDS manager 611 are illustrated as computer-like devices, their physical existence is not limited to a particular device. Each may exist as a standalone device or implemented as software resident in a physical device or server.

The heart of the exemplary utility data center illustrated in FIG. 6 is the data center utility controller (UC) LAN, 601. This LAN represents another, higher, internal trust domain. UC LAN communicates through OC LAN 605 and is typically separated from it by various forms of firewalls 602. UC LAN 601 can comprise various numbers of resource managers, such as illustrated at 603. The flexibility inherent in the UDC concept can result in many combinations of resources and resource managers. Resource managers 603 are the typical interface with the various pools of resources 606, communicating with them through ports and some sort of switching network as indicated by the tier 1 switch at 608.

In one embodiment, the resource managers 603 include an actual network access control construct accessor for accessing the actual network access control construct coupled with a port of a network switch. The actual network access control construct for defining the device actually coupled with the port of the network switch. In addition, the resource manager 603 also includes a verification protocol for verifying that the actual network access control construct on the port of the network switch correlates with the pre-determined network access control construct defined by the machine-readable map. In another embodiment, the verification protocol may reside on a separate computing system within the UDC. In yet another embodiment, the verification protocols may reside on a plurality of the computing devices within the UDC.

Resource pools 606 are limitlessly flexible, comprising any conceivable combination of data servers, computational capability, load balancing servers or any other device or capability imaginable. Because the possible varieties of resources that can be included in resource pools 606, they are separated from UC LAN 601 by firewalls 604, which, like UC firewalls 602, can be software or hardware or both, in many combinations.

It is noted that embodiments of the present invention can run in many different environments. One network management environment in which an embodiment operates serves as an end-to-end service management infrastructure and is particularly well suited to managing a provisionable network which can also be known as a utility data center (UDC).

In summary, embodiments of the present invention provide methods and systems for automatic verification of a network access control construct for a network switch. By using the methods and systems for automatic verification of a network access control construct for a network switch, one or more switches (e.g., SAN switches) can be automatically checked for correctness of their configured network access control constructs (e.g., ACLs). By using the automated method, correctness of the configuration of networked devices can be verified in much less time, at greatly reduced expense.

In addition, the present invention allows a network administrator to automatically discover network access control constructs (e.g., ACLs) problems in a SAN configuration. The problems include, but are not limited to, forgotten ACL definitions that should have been deleted, missing ACLs that were omitted by mistake, incorrect ACLs caused by user error, security-breaching ACL changes introduced maliciously, and the like. In one embodiment, the corrective action is taken automatically, thereby reducing human error, reducing cost and increasing security.

Additionally, by running automatically, the verifier can be run often, or constantly to provide an ongoing validation of the network. Moreover, the present invention provides automation of the ACL-checking portion of a security audit. Therefore, the report is valuable even when reporting no errors with respect to the ACLs. That is, a report having no ACL errors provides validation of the operation of the ACLs throughout the network (e.g., the SAN).

Embodiments of the present invention are thus described. While the present invention has been described in particular embodiments, it should be appreciated that the present invention should not be construed as limited by such embodiments, but rather construed according to the following claims.

I claim:

1. A method for automatic verification of a network access control construct for a network switch, the method comprising:
   accessing an actual network access control construct associated with a port on a network switching device, said actual network access control construct for defining whether a device is currently authorized by said network switching device to access said network switching device;
   accessing a machine-readable network map of a network that said network switching device is associated with, said map providing a pre-determined network access control construct defining whether the device should be authorized to access said network switching device;
   automatically verifying whether to modify the actual network access control construct to provide the device with authorization to access the network switching device and for verifying whether to modify the actual network access control construct to prevent the device from unauthorized access to the network switching device if the device is not authorized by comparing the actual network access control construct associated with the network switching device's port with the pre-determined network access control construct defined by said machine-readable map, wherein said machine-readable network map includes a plurality of network access control constructs and for each of said network access control constructs in the machine-readable network map the automatically verifying further comprises verifying that a corresponding actual network access control construct has been defined in the network's fabric, and that each of said actual network access control construct is based on a particular port of a particular network switching device and determining whether each World Wide Names (WWNs) defined in each of the actual network access control construct correspond to at least one WWN defined in at least one pre-defined network access control construct associated with the machine-readable network map; and
   providing the authorization to access the network switch and preventing the unauthorized access of the network switch by automatically correcting the actual network access control construct based on differences between the actual network access control construct and the pre-determined network access control construct that were determined by the comparing.

2. The method of claim 1 further comprising:
   providing a report documenting the result of the automatically verifying.

3. The method of claim 1 further comprising:
   accessing a plurality of actual network access control constructs via a master network switching device.

4. The method of claim 1 wherein the automatically verifying further comprises:
   verifying that every actual network access control construct associated with said network switching device is defined in the pre-defined network access control construct of the machine-readable map.

5. The method of claim 1 wherein each time an error is found the method further comprises:
  providing an error message indicating details of the actual network access control construct error; and
  providing instructions for automatic correction of the network access control construct error.

6. The method of claim 5 further comprising:
  providing a machine-readable script containing instructions for the automatic correction of the actual network access control construct.

7. An apparatus for performing automatic verification of a network access control construct for a network switch, the apparatus comprising:
  a processor;
  an actual network access control construct accessor for accessing an actual network access control construct associated with a port on a network switching device, said actual network access control construct for defining whether a device is currently authorized by said network switching device to access said network switching device;
  a machine-readable map accessor for accessing a machine-readable map showing devices coupled with said network switch, said machine-readable map providing a pre-determined network access control construct defining whether the device should be authorized to access said network switching device;
  an automated verification protocol for verifying whether to modify the actual network access control construct to provide the device with authorization to access the network switching device and for verifying whether to modify the actual network access control construct to prevent the device from accessing the network switching device if the device is not authorized by comparing the actual network access control construct with the pre-determined network access control construct defined by said machine-readable map; and
  providing the authorization to access the network switch and preventing unauthorized access of the network switch by automatically correcting the actual network access control construct based on differences between the actual network access control construct and the pre-determined network access control construct that were determined by the comparing, wherein said actual network access control construct comprises an identifier for said actual network access control construct, a port number on the network switching device port to which said actual network access control construct is coupled, and a world-wide name (WWN) of a computing device authorized to be connected to said network switching device port.

8. The apparatus of claim 7 wherein said network switch is a portion of an information system network comprising:
  at least one computing device;
  at least one storage device; and
  at least one storage area network (SAN) switching device for creating interconnects between said at least one computing device and said at least one storage device.

9. The apparatus of claim 8 wherein said SAN switching device further comprises:
  at least one network access control construct for defining which device will communicate with a particular SAN switch for at least one port of said SAN switch.

10. The apparatus of claim 7 wherein said machine-readable map of networked devices comprises:
  a network map of details of cabling between devices and details of each network access control construct.

11. The apparatus of claim 7 further comprising:
  a report generator for generating a report documenting results of the automated verification protocol.

12. The apparatus of claim 7 wherein said actual network access control construct is an access control list (ACL).

13. A non-transitory computer-usable medium having computer-readable program code stored thereon for causing a method for automatic verification of a network access control construct for a network switch, the method comprising:
  accessing an actual network access control construct associated with a port on a network switching device, said actual network access control construct for defining whether a device is currently authorized by said network switching device to access said network switching device;
  accessing a machine-readable network map of a network that said network switching device is associated with, said map providing a pre-determined network access control construct defining whether the device should be authorized to access said network switching device;
  automatically verifying whether to modify the actual network access control construct to provide the device with authorization to access the network switching device and for verifying whether to modify the actual network access control construct to prevent the device from accessing the network switching device if the device is not authorized by comparing the actual network access control construct with the pre-determined network access control construct defined by said machine-readable map, wherein said machine-readable network map includes a plurality of network access control constructs and for each of said network access control constructs in the network map the automatically verifying further comprises verifying that a corresponding actual network access control construct has been defined in the network's fabric, and that each of said actual network access control construct is based on a particular port of a particular network switching device and determining whether each World Wide Names (WWNs) defined in each of the actual network access control construct correspond to at least one WWN defined in at least one pre-defined network access control construct associated with the machine-readable network map; and
  providing the authorization to access the network switch and preventing unauthorized access of the network switch by automatically correcting the actual network access control construct based on differences between the actual network access control construct and the pre-determined network access control construct that were determined by the comparing.

14. The non-transitory computer-usable medium of claim 13 further comprising:
  providing a report documenting result of the automatically verifying.

15. The non-transitory computer-usable medium of claim 13 further comprising:
  accessing a plurality of actual network access control constructs via a master network switching device.

16. The non-transitory computer-usable medium of claim 13 wherein the automatically verifying further comprises:
  verifying that every actual network access control construct associated with said network switching device is defined in the pre-defined network access control construct of the machine-readable map.

17. The non-transitory computer-usable medium of claim 13 wherein each time an error is found the method further comprises:

providing an error message indicating details of the actual network access control construct error; and providing instructions for automatic correction of the network access control construct error.

18. The non-transitory computer-usable medium of claim 17 further comprising:

providing a machine-readable script containing instructions for the automatic correction of the actual network access control construct.

19. A data center comprising:

a plurality of devices; with each device represented in a machine-readable map, said map further providing a pre-determined network access control construct defining the device which should be coupled with a port of a network switch;

wherein at least one of said plurality of devices comprises:

an actual network access control construct accessor for accessing the actual network access control construct coupled with a port of a network switch, said actual network access control construct for defining whether a device is currently authorized to access said port of said network switch;

wherein one of said plurality of devices further comprises:

a verification protocol for verifying whether to modify the actual network access control construct on said port of said network switch to enable said one of said plurality of devices to access said network switch and verifying whether to modify the actual network access control construct on said port of said network switch to prevent said one of said plurality of devices from accessing said network switch if said one of said plurality of devices is not authorized based on whether said actual network access control construct correlates with said pre-determined network access control construct defined by said machine-readable map; and the verification protocol for providing the authorization to access the network switch and preventing unauthorized access of the network switch by automatically correcting the actual network access control construct based on differences between the actual network access control construct and the pre-determined network access control construct that were determined by the correlation, wherein said actual network access control construct comprises an identifier for said actual network access control construct, a port number on the network switching device port to which said actual network access control construct is coupled, and a world-wide name (WWN) of a computing device authorized to be connected to said network switching device port.

20. The data center of claim 19 further comprising:

a report file containing a message generated by said verification protocol.

21. The data center of claim 19 wherein said actual network access control construct being accessed is an access control list (ACL).

* * * * *